(12) United States Patent
Fukui et al.

(10) Patent No.: US 11,189,429 B2
(45) Date of Patent: Nov. 30, 2021

(54) ELECTROLYTIC CAPACITOR AND METHOD FOR MANUFACTURING SAME

(71) Applicant: Panasonic Intellectual Property Management Co., Ltd., Osaka (JP)

(72) Inventors: Hitoshi Fukui, Nara (JP); Ai Makino, Aichi (JP); Hiroshi Kojima, Aichi (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/733,097

(22) PCT Filed: Dec. 21, 2018

(86) PCT No.: PCT/JP2018/047166
§ 371 (c)(1),
(2) Date: May 15, 2020

(87) PCT Pub. No.: WO2019/131477
PCT Pub. Date: Jul. 4, 2019

(65) Prior Publication Data
US 2020/0279692 A1    Sep. 3, 2020

(30) Foreign Application Priority Data
Dec. 28, 2017  (JP) ................ JP2017-254993

(51) Int. Cl.
*H01G 9/028*  (2006.01)
*H01G 9/00*  (2006.01)
(Continued)

(52) U.S. Cl.
CPC ........... *H01G 9/028* (2013.01); *H01G 9/0036* (2013.01); *H01G 9/07* (2013.01); *H01G 9/15* (2013.01)

(58) Field of Classification Search
None
See application file for complete search history.

(56) References Cited

U.S. PATENT DOCUMENTS 6,381,121 B1 * 4/2002 Monden ............... H01G 11/48
361/525
6,517,892 B1 * 2/2003 Sakai ................... H01G 11/48
427/80
(Continued)

FOREIGN PATENT DOCUMENTS

CN    101932628 A    12/2010
CN    102731970 A    10/2012
(Continued)

OTHER PUBLICATIONS

International Search Report of PCT application No. PCT/JP2018/047166 dated Mar. 19, 2019.
(Continued)

*Primary Examiner* — Dion R. Ferguson
(74) *Attorney, Agent, or Firm* — McDermott Will and Emery LLP

(57) ABSTRACT

A method for manufacturing an electrolytic capacitor includes: preparing an anode body that includes a dielectric layer, and forming a solid electrolyte layer on the dielectric layer. The forming of the solid electrolyte layer includes: forming a first conductive polymer layer on the dielectric layer, applying a first treatment liquid to the first conductive polymer layer, and forming a second conductive polymer layer after the applying of the first treatment liquid. The first conductive polymer layer includes a first conductive polymer. The first treatment liquid contains a first compound and a solvent. The first compound has a skeleton of naphthalene or anthraquinone, and includes at least one $SO_3$-containing group bonded to the skeleton. The at least one $SO_3$-contain-
(Continued)

ing group is at least one selected from a group consisting of a sulfonic acid group and a sulfonate group.

4 Claims, 1 Drawing Sheet

(51) Int. Cl.
  *H01G 9/07* (2006.01)
  *H01G 9/15* (2006.01)

(56) References Cited

U.S. PATENT DOCUMENTS

| | | | | |
|---|---|---|---|---|
| 2005/0237696 | A1* | 10/2005 | Takeda | H01G 9/025 361/504 |
| 2010/0127205 | A1* | 5/2010 | Yoshimitsu | H01G 9/028 252/62.2 |
| 2010/0165548 | A1* | 7/2010 | Sugihara | C08K 5/0091 361/527 |
| 2015/0262754 | A1* | 9/2015 | Nagashima | H01G 9/0036 427/79 |
| 2016/0163465 | A1* | 6/2016 | Morioka | H01G 9/028 361/528 |
| 2019/0006110 | A1* | 1/2019 | Yamaguchi | H01G 9/008 |
| 2019/0062501 | A1* | 2/2019 | Onodera | C08K 5/09 |
| 2020/0279691 | A1* | 9/2020 | Fukui | H01G 9/15 |

FOREIGN PATENT DOCUMENTS

| | | |
|---|---|---|
| CN | 104813422 A | 7/2015 |
| JP | 2010-129789 | 6/2010 |
| JP | 2014-086473 | 5/2014 |
| WO | 2014/087617 | 6/2014 |
| WO | 2017/163728 | 9/2017 |

OTHER PUBLICATIONS

English Translation of Chinese Office Action dated Jun. 2, 2021 for the related Chinese Patent Application No. 201880082939.3.

* cited by examiner

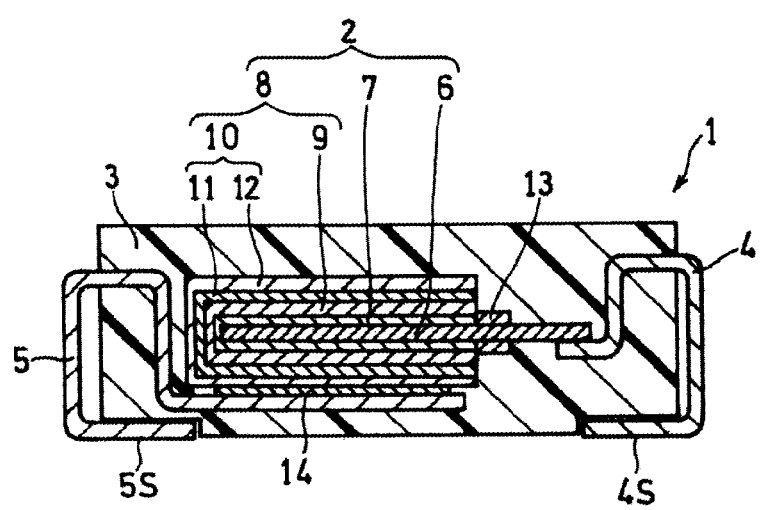

ELECTROLYTIC CAPACITOR AND METHOD FOR MANUFACTURING SAME

This application is a U.S. national stage application of the PCT International Application No. PCT/JP2018/047166 filed on Dec. 21, 2018, which claims the benefit of foreign priority of Japanese patent application No. 2017-254993 filed on Dec. 28, 2017, the contents all of which are incorporated herein by reference.

TECHNICAL FIELD

The present invention relates to an electrolytic capacitor and a method for manufacturing the same.

BACKGROUND

As a small-sized capacitor with large capacitance and low equivalent series resistance (ESR), an electrolytic capacitor has been regarded as promising candidate. The electrolytic capacitor includes an anode body, a dielectric layer formed on the anode body, and a solid electrolyte layer formed on the dielectric layer and containing a conductive polymer.

From the viewpoint of obtaining an electrolytic capacitor with excellent moisture resistance, International Publication No. 2014-87617 proposes the following steps for forming the solid electrolyte layer. A first conductive polymer layer is formed by applying a first conductive polymer solution, in which fine particles of a conductive polymer are dispersed, and drying the solution. And aromatic sulfonic acid having a carboxyl group and a hydroxyl group or two carboxyl groups, or a salt of the aromatic sulfonic acid is applied onto the first conductive polymer layer. And then a second conductive polymer layer is formed by applying a second conductive polymer solution, in which fine particles of the conductive polymer are dispersed, and drying the solution.

From the viewpoint of obtaining an electrolytic capacitor with low ESR and excellent high-temperature moisture resistance, Unexamined Japanese Patent Publication No. 2014-86473 proposes the following steps for forming the solid electrolyte layer. A sulfonic acid alkyl amine salt, having at least one sulfonic acid selected from a group consisting of benzenesulfonic acid or its derivative and naphthalenesulfonic acid or its derivative, and alkyl amine with a carbon number (C) of 5 to 12 is applied onto a capacitor element. And then a solid electrolyte is formed by using a conductive polymer dispersion liquid.

SUMMARY

There is room for further improvement from the viewpoint of improving the heat resistance property and moisture resistance property of the electrolytic capacitor.

One aspect of the present invention relates to a method for manufacturing an electrolytic capacitor. The method includes: preparing an anode body that includes a dielectric layer, and forming a solid electrolyte layer on the dielectric layer. The forming of the solid electrolyte layer includes: forming a first conductive polymer layer on the dielectric layer, applying a first treatment liquid to the first conductive polymer layer, and forming a second conductive polymer layer on the first conductive polymer layer after the applying of the first treatment liquid. The first conductive polymer layer includes a first conductive polymer. The first treatment liquid contains a first compound and a solvent. The first compound has a skeleton of naphthalene or anthraquinone, and includes at least one $SO_3$-containing group bonded to the skeleton. The at least one $SO_3$-containing group is at least one selected from a group consisting of a sulfonic acid group and a sulfonate group.

Another aspect of the present invention relates to a method for manufacturing an electrolytic capacitor. The method includes: preparing an anode body that includes a dielectric layer, and forming a solid electrolyte layer on the dielectric layer. The forming of the solid electrolyte layer includes: forming a first conductive polymer layer on the dielectric layer, applying a first treatment liquid to the first conductive polymer layer, and forming a second conductive polymer layer on the first conductive polymer layer after the applying of the first treatment liquid. The first conductive polymer layer includes a first conductive polymer. The first treatment liquid contains a first compound and a solvent. The first compound has a skeleton of benzene, naphthalene, or anthraquinone, and includes two or more $SO_3$-containing group bonded to the skeleton. Each of the two or more $SO_3$-containing group is at least one selected from a group consisting of a sulfonic acid group and a sulfonate group.

Still another aspect of the present invention relates to an electrolytic capacitor. The electrolytic capacitor includes: an anode body, a dielectric layer disposed on a surface of the anode body, and a solid electrolyte layer disposed on a surface of the dielectric layer. The solid electrolyte layer includes a conductive polymer, a first compound, and a second compound that is different from the first compound. The first compound has a skeleton of naphthalene or anthraquinone, and includes at least one $SO_3$-containing group bonded to the skeleton. The at least one $SO_3$-containing group is at least one selected from a group consisting of a sulfonic acid group and a sulfonate group. The second compound includes a polyanionic acid.

Still another aspect of the present invention relates to an electrolytic capacitor. The electrolytic capacitor includes: an anode body, a dielectric layer disposed on a surface of the anode body, and a solid electrolyte layer disposed on a surface of the dielectric layer. The solid electrolyte layer includes a conductive polymer, a first compound, and a second compound that is different from the first compound. The first compound has a skeleton of benzene, naphthalene, or anthraquinone, and includes two or more $SO_3$-containing group bonded to the skeleton. Each of the two or more $SO_3$-containing group is at least one selected from a group consisting of a sulfonic acid group and a sulfonate group. The second compound includes a polyanionic acid.

According to the present invention, the electrolytic capacitor excellent in both moisture resistance property and heat resistance property can be provided.

BRIEF DESCRIPTION OF DRAWINGS

FIG. 1 is a schematic sectional view illustrating an electrolytic capacitor according to an exemplary embodiment of the present invention.

DESCRIPTION OF EMBODIMENT

Hereinafter, a method for manufacturing an electrolytic capacitor of the present invention will be described in detail.
(Step of Preparing Anode Body Including Dielectric Layer)

An anode body is formed, for example, by roughening a surface of a foil-shaped or plate-shaped base material formed using a conductive material. The surface roughening may be performed by any method capable of forming irregularities on the surface of the base material. The surface roughening may be performed by, for example, etching the surface of the base material (electrolytic etching, etc.). The surface roughening may also be performed by depositing particles of a conductive material on the surface of the base material, through use of a vapor phase fabrication method such as vapor deposition.

Powder of the conductive material may be molded into a desired shape (block shape, etc.) in a state where one end of a rod-shaped anode lead in the longitudinal direction is embedded in the powder, and the molded body may be sintered. Thereby, an anode body having a porous structure in which one end of the anode lead is embedded is obtained.

Examples of the conductive material used for the anode body include a valve metal, an alloy including the valve metal, and a compound including the valve metal. One kind of these materials can be used alone, or a combination of two or more of these materials can be used. As the valve metal, for example, tantalum, niobium, titanium, or aluminum are used preferably.

Next, a dielectric layer is formed on the surface of the anode body. The dielectric layer is formed by subjecting the anode body to anodizing treatment or anodic oxidation. The anodic oxidation proceeds, for example, by immersing the anode body in an electrolytic solution, impregnating the pores and pits of the anode body with the electrolytic solution, and applying a voltage between the anode body as an anode and a cathode in the electrolytic solution. As the electrolytic solution, it is preferable to use an aqueous solution of phosphoric acid, for example.

The dielectric layer contains an oxide of a conductive material (particularly, a valve metal). For example, when tantalum is used as the valve metal, the dielectric layer contains $Ta_2O_5$. When aluminum is used as the valve metal, the dielectric layer contains $Al_2O_3$. Note that the dielectric layer is not limited to these.

(Step of Forming First Conductive Polymer Layer)

Next, a first conductive polymer layer including a first conductive polymer is formed on the surface of the dielectric layer. The first conductive polymer layer may be formed so as to cover at least a part of the dielectric layer. The first conductive polymer layer may include a first dopant. The first dopant may be in the state of being doped with the conductive polymer or in the state of being bonded to the conductive polymer. The first conductive polymer layer may be formed with one layer, or may be formed with a plurality of layers. The average thickness of the first conductive polymer layer may range approximately from 0.01 µm to 10 µm, inclusive.

As the first conductive polymer, for example, a π-conjugated conductive polymer can be used. Examples of the π-conjugated conductive polymer include polymers with a basic skeleton of polypyrrole, polythiophene, polyfuran, polyaniline, polyacetylene, polyphenylene, polyphenylenevinylene, polyacene, and/or polythiophenvinylene.

The first conductive polymer also includes a homopolymer, a copolymer of two or more monomers, and derivatives of these polymers (a substitute having a substituent group, etc.). For example, polythiophene includes poly(3,4-ethylenedioxythiophene) and the like. As the first conductive polymer, one kind may be used alone, or two or more kinds may be used in combination. The weight-average molecular weight of the conductive polymer is not particularly limited, but ranges, for example, from 1,000 to 1,000,000, inclusive.

The first conductive polymer layer may be formed on the surface of the dielectric layer by polymerizing the precursor of the first conductive polymer. Examples of the precursor of the conductive polymer include monomers and/or oligomers capable of forming a conductive polymer. As the polymerization method, either chemical oxidative polymerization or electrolytic oxidative polymerization can be employed. In the case of the chemical polymerization, the polymerization may be performed in the presence of an oxidizing agent (catalyst). As the oxidizing agent, metal sulfonates such as ferrous sulfate and ferric sulfate, and persulfates such as ammonium persulfate, sodium persulfate and potassium persulfate can be used. The conductive polymer may be synthesized in advance before being attached to the anode body including the dielectric layer.

The polymerization liquid used for the polymerization is prepared by mixing a solvent with the precursor of the conductive polymer as needed. As the solvent of the polymerization liquid, for example, water, an organic solvent, or a mixture of the water and organic solvent is used. The polymerization liquid may contain a first dopant.

The first conductive polymer layer may be formed by applying a liquid that contains the first conductive polymer to the dielectric layer, and drying the liquid. The liquid containing the first conductive polymer may be, for example, a solution or a dispersion liquid (hereinafter, a first dispersion) containing the first conductive polymer and the first dopant. The first conductive polymer layer can be formed by applying the first dispersion onto the dielectric layer and then drying it. As the solvent (dispersion medium) used for the first dispersion, for example, water, an organic solvent, or a mixture of the water and organic solvent is used. The content ratio of the first dopant in the first conductive polymer layer may range from 10 parts by mass to 1,000 parts by mass, inclusive, with respect to 100 parts by mass of the first conductive polymer.

As the first dopant, one having an anionic group such as a sulfonic acid group, a carboxyl group, a phosphoric acid group, and/or a phosphonic acid group is used. The first dopant may have one kind of anionic group, or may have two or more kinds. The anionic group is preferably a sulfonic acid group, and may be a combination of a sulfonic acid group and an anionic group other than the sulfonic acid group. The first dopant may be a low-molecular dopant or a high-molecular dopant. The first conductive polymer layer may include only one type of the first dopant, or may contain two or more types of the first dopant.

Examples of the low-molecular dopant include alkylbenzenesulfonic acid such as benzenesulfonic acid and p-toluenesulfonic acid, naphthalenesulfonic acid, and anthraquinonesulfonic acid.

Examples of the high-molecular dopant include a homopolymer of a monomer having a sulfonic acid group, a copolymer of a monomer having a sulfonic acid group and another monomer, and a sulfonated phenol resin. Examples of the monomer having a sulfonic acid group include styrenesulfonic acid, vinylsulfonic acid, allylsulfonic acid, 2-acrylamido-2-methylpropanesulfonic acid, and isoprenesulfonic acid. As other monomers, aromatic dicarboxylic acids such as phthalic acid, isophthalic acid, and terephthalic acid are preferred. The weight-average molecular weight of the high-molecular dopant ranges, for example, from 1,000 to 1,000,000, inclusive. The use of such a high-molecular dopant facilitates reducing ESR.

(Step of Applying First Treatment Liquid to First Conductive Polymer Layer)

Next, the first conductive polymer layer is brought into contact with the first treatment liquid. The first treatment liquid includes a first compound and a solvent that dissolves the first compound. The first compound has a skeleton of benzene, naphthalene, or anthraquinone (hereinafter, also referred to as a BNA skeleton), and includes at least one $SO_3$-containing group bonded to the BNA skeleton or two or more $SO_3$-containing groups bonded to the BNA skeleton. The $SO_3$-containing group is at least one selected from the group consisting of a sulfonic acid group and a sulfonate group.

By applying the first treatment liquid to the first conductive polymer layer, an adhesion between the first conductive polymer layer and a second conductive polymer layer, which is subsequently formed, is improved. It is considered that the first compound has excellent affinity with the first conductive polymer layer and is uniformly distributed on the surface of the first conductive polymer layer. By forming the second conductive polymer layer via the first compound, homogeneity of the second conductive polymer layer can be improved. This leads to reduction in the resistance at an interface between the first conductive polymer layer and the second conductive polymer layer. From the above, it is considered that an electrolytic capacitor having excellent moisture resistance property and heat resistance property can be obtained.

The moisture resistance property is an index in a case where the electrolytic capacitor is used for a long time in a high humidity atmosphere. For example, the moisture resistance property is evaluated based on the capacitance and the ESR after the storage of the electrolytic capacitor at 85° C./85% relative humidity (RH) for 125 hours with a rated voltage applied. In other words, the better the moisture resistance property is, the higher the resistance to corrosion of the anode body (particularly aluminum) is.

The heat resistance property is an index in a case where the electrolytic capacitor is stored for a long time in a high-temperature atmosphere. For example, the heat resistance is evaluated based on the capacitance and the ESR after the storage of the electrolytic capacitor at 145° C. for 125 hours under unloaded state.

A concentration of the first compound in the first treatment liquid may range, for example, from 0.011 mol/L to 2 mol/L, inclusive, and preferably from 0.03 mol/L to 1.5 mol/L, inclusive. A pH of the first treatment liquid measured at 25° C. may range, for example, from 2 to 9, inclusive, and preferably from 2 to 6, inclusive.

Water, an organic solvent, or a mixture of the water and organic solvent can be used as the solvent of the first treatment liquid. As the organic solvent, for example, monovalent to tetravalent alcohols, dimethyl sulfoxide, N,N-dimethylformamide, tetrahydrofuran, and the like can be used. It is preferable that the main component of the solvent be water in terms of ease of handling in the manufacturing process and environmental load, and it is more preferable that more than and equal to 60% by mass of the solvent be water.

After applying the first treatment liquid to the first conductive polymer layer, at least a part of the solvent may be volatilized. At that time, the first conductive polymer layer may be heated up to a temperature ranging from 50° C. to 250° C., inclusive.

The benzene skeleton, which the first compound may have, means a concept including benzene and a benzene derivative. The benzene derivative comprehensively means benzene in which a hydrogen atom has been substituted with another group.

The naphthalene skeleton, which the first compound may have, means a concept including naphthalene and a naphthalene derivative. The naphthalene derivative comprehensively means naphthalene in which a hydrogen atom is substituted with another group.

The anthraquinone skeleton, which the first compound may have, means a concept including anthraquinone and an anthraquinone derivative. The anthraquinone derivative comprehensively means anthraquinone in which a hydrogen atom is substituted with another group.

At least one $SO_3$-containing groups is directly bonded to the BNA skeleton, or two or more $SO_3$-containing groups are directly bonded to the BNA skeleton. The $SO_3$-containing group is at least one selected from the group consisting of a sulfonic acid group and a sulfonate group.

The sulfonic acid group is an $SO_3H$ group. Meanwhile, the $SO_3H$ group may be ion-dissociated and may be present as an $SO_3$ anion group. And the $SO_3$ anion group may be in a bonding state or a pseudo-bonding state, by an electrical interaction, with a conductive polymer or a cation (hydrogen ion, etc.) in the solid electrolyte layer. Here, the pseudo-bonding state means a state that two entities are present within a distance at which a mutual influence between them is exerted by the electrical interaction, and have electric neutrality as a whole.

The sulfonate group is a salt-type $SO_3$-containing group formed by a reaction between a sulfonic acid group and an alkali, and can be represented as an $SO_3M$ group. The $SO_3M$ group is directly bonded to the BNA skeleton in the form of an ammonium salt, a metal salt, or the like. Meanwhile, the $SO_3M$ group may be ion-dissociated and may be present as an $SO_3$ anion group. The $SO_3$ anion group may be in a bonding state or a pseudo-bonding state, by an electrical interaction, with a conductive polymer or a cation (M ion, etc.) in the solid electrolyte layer. When a plurality of $SO_3$-containing groups are bonded to the BNA skeleton, the plurality of $SO_3$-containing groups may be the same or different from each other. When the BNA skeleton is a benzene skeleton, two or more $SO_3$-containing groups are bonded to the benzene skeleton, so that the moisture resistance property and the heat resistance property of the electrolytic capacitor are improved remarkably.

It is considered that the greater a number of $SO_3$-containing groups is, the higher the affinity between the first compound and the first conductive polymer layer is. Meanwhile, from the viewpoint of adjusting the acidity of the first compound to a moderate degree, a number of $SO_3M$ groups bonded to the BNA skeleton is preferably 3 or less, more preferably 2 or less, and most preferably 2. When the number of $SO_3$-containing groups is two or three, it becomes easy to form a more uniform solid electrolyte layer. It is considered that with the first compound having 2 to 3 $SO_3$-containing groups, the adhesion between the first conductive polymer layer and the second conductive polymer layer is further improved, and the interface resistance is reduced more significantly.

The $SO_3$-containing group may be bonded to any position of the BNA skeleton. The first compound may be a mixture of a plurality of isomers having bonding positions of the $SO_3$-containing group which are different from each other. The first compound may be a mixture of a plurality of compounds having different numbers of $SO_3$-containing groups. Meanwhile, the first compound having a specific number of $SO_3$-containing groups accounts for preferably more than or equal to 30 mol %, and more preferably more than or equal to 50 mol %, of the whole first compound in terms of availability and ease of synthesis.

M is $N(R)_4$ (onium group) or a metal atom. Here, R in $N(R)_4$ may be independently a hydrogen atom or a hydrocarbon group. At least one R in $N(R)_4$ may be a hydrogen atom derived from, for example, an $SO_3H$ group.

Examples of the metal atom M include an alkali metal being a monovalent metal, and divalent or higher-valent metals such as an alkaline earth metal. As the alkali metal, Na, Li and the like are preferred. As the divalent or higher valent metal, Ca, Mg and the like are preferred. When M is a divalent or higher metal, a plurality of $SO_3$ anion groups are bonded to the BNA skeleton, and one metal form a salt with two or more $SO_3$ anion groups among the plurality of $SO_3$ anion groups.

When M is $N(R)_4$, the sulfonate group ($SO_3M$ group) is an amine salt group. At this time, $N(R)_4$ may be an onium group in which a hydrogen atom is coordinated to an amine compound having an amino group such as a —$NH_2$ group, a —NH group, and a —N group. Among the onium groups, the onium group derived from an amine compound having a —$NH_2$ group is preferred. The hydrocarbon group bonded to the nitrogen atom N of the amino group is a linear or branched alkyl group or an aromatic group (a group containing a benzene ring, a naphthalene ring, etc.). An amino group may further be present in the hydrocarbon group. That is, a number of amino groups in the onium group is not limited to one but may be two or more. As specific examples of the hydrocarbon group, there is no particular limitation, but an alkyl group is preferred, and among the alkyl groups, an alkyl group having from 1 to 12 carbon atoms, inclusive, is preferred.

The onium group derived from the amine compound further improve the adhesion between the first conductive polymer layer, as a lower layer, and the second conductive polymer layer formed via the first compound. Even when the first conductive polymer layer or the second conductive polymer layer is formed in a plurality of times to be laminated, the adhesion between a lower layer and an upper layer in the conductive polymer layer is improved by applying the first treatment liquid to the lower layer.

Specific examples of the amine compound having a —$NH_2$ group include, for example, butylamine, hexylamine, pentylamine, peptylamine, octylamine, nonylamine, decylamine, undecylamine, dodecylamine, 1,4-diaminobutane, 1,5-diaminopentane, 1,6-diaminohexane, 1,7-diaminoheptane, 1,8-diaminooctane, 1,9-diaminononane, 1,10-diaminodecane, 1,11-diaminoundecane, 1,12-diaminododecane, aniline, phenylenediamine, diaminonaphthalene and derivatives of these.

Specific examples of the amine compound having an —NH group include dipropylamine, diisopropylamine, methylhexylamine, diisobutylamine, ethylhexylamine, diphenylamine, N,N-dimethylethylenediamine, and derivatives of these.

Specific examples of the amine compound having a —N group include N,N-dimethylethylamine, N,N-dimethylpropylamine, N,N-dimethylbutylamine, N,N-dimethylpentylamine, N,N-dimethylhexylamine, N,N-dimethylhebutylamine, N,N-dimethyloctylamine, N,N-dimethylnonylamine, N,N-dimethyldecylamine, N,N-dimethylundecylamine, N,N-dimethyldodecylamine, triethylamine, tripropylamine, tributylamine, dimethylcyclohexylamine, and derivatives of these.

(Step of Forming Second Conductive Polymer Layer)

A second conductive polymer layer is formed on the first conductive polymer layer to which the first treatment liquid has been applied. The average thickness of the second conductive polymer layer may range approximately from 1 µm to 100 µm, inclusive. The second conductive polymer layer may include a second dopant. In the second conductive polymer layer, the second dopant may be included in the state of being doped with the conductive polymer, or may be included in the state of being bonded to the conductive polymer. The content ratio of the second dopant included in the second conductive polymer layer ranges preferably from 10 parts by mass to 1,000 parts by mass, inclusive, with respect to 100 parts by mass of the second conductive polymer.

The second conductive polymer and the second dopant can be appropriately selected from those exemplified for the first conductive polymer and the first dopant, respectively, and a formation method for the second conductive polymer layer also follows that for the first conductive polymer layer.

The second conductive polymer layer may be formed by applying a liquid containing the second conductive polymer onto the first conductive polymer layer to which the first treatment liquid has been applied, and drying the liquid. This can facilitate forming a solid electrolyte layer having dense film quality. The liquid containing the second conductive polymer may be, for example, a solution or a dispersion liquid (hereinafter, a second dispersion) containing fine particles of second conductive polymer and the second dopant. As the second dispersion, those exemplified for the first dispersion can be used appropriately.

(Polymer Dispersion)

The first dispersion or the second dispersion (hereinafter simply referred to as a dispersion) is a mixture of fine particles containing a conductive polymer and a solvent (dispersion medium). The dispersion is obtained by, for example, adding an oxidizing agent to a liquid containing a precursor monomer of a conductive polymer, a dopant having an anionic group (polyanionic acid), and a solvent, and performing chemical oxidative polymerization of the precursor monomer. As the solvent, water, an organic solvent, or a mixture of water and an organic solvent may be used, and it is preferable to use water as a main component. In the fine particles, the conductive polymer is doped with the polyanionic acid and linked to form an aggregate.

The fine particles preferably have an average particle size ranging from 5 nm to 500 nm, inclusive. Among the fine particles, the fine particles contained in the first dispersion preferably have an average particle size of less than or equal to 100 nm so as to easily enter the voids of the dielectric layer. The fine particles contained in the second dispersion preferably have an average particle size ranging from 100 nm to 500 nm, inclusive, from the viewpoint of forming a thick solid electrolyte layer. The average particle size of the fine particles can be calculated from a particle size distribution measured by the dynamic light scattering method.

For the polyanionic acid, a polymer having a sulfo group is preferred as a functional group, and examples of the polymer include polystyrenesulfonic acid, polyethylenesulfonic acid, polyestersulfonic acid, phenolsulfonic acid novolak resin, polyacrylsulfonic acid, and polyvinylsulfonic acid. The weight-average molecular weight of polystyrene sulfonic acid ranges preferably from 50,000 to 500,000, inclusive, and the weight-average molecular weight of polyester sulfonic acid and phenol sulfonic acid novolak resin ranges preferably from 5,000 to 80,000, inclusive. The amount of the polyanionic acid to be doped is preferably from 0.1 mol to 10 mol, inclusive, per mol of the conductive polymer.

(Step of Forming Cathode Layer)

Next, a carbon layer and a silver-paste layer are sequentially laminated on the surface of the solid electrolyte layer to form a cathode layer.

FIG. 1 is a schematic sectional view illustrating the electrolytic capacitor according to the present exemplary embodiment. As shown in FIG. 1, electrolytic capacitor 1 includes capacitor element 2, resin sealing material 3 for sealing capacitor element 2, anode terminal 4, and cathode terminal 5. Outside resin sealing material 3, a part of anode terminal 4 and a part of cathode terminal 5 are exposed. Anode terminal 4 and cathode terminal 5 may be formed using a metal such as copper or a copper alloy. For resin sealing material 3, for example, an epoxy resin may be used.

Capacitor element 2 includes anode body 6, dielectric layer 7 covering a surface of anode body 6, and cathode part 8 covering a surface of dielectric layer 7. Cathode part 8 includes solid electrolyte layer 9 covering the surface of dielectric layer 7, and cathode lead-out layer 10 covering a surface of solid electrolyte layer 9. Cathode lead-out layer 10 includes carbon layer 11 and silver-paste layer 12.

Anode body 6 includes a region facing cathode part 8 and a region not facing cathode part 8. The region not facing cathode part 8 is electrically connected to anode terminal 4 by welding. Insulating separation layer 13 is formed in a portion adjacent to cathode part 8 in the region not facing cathode part 8 so as to cover the surface of anode body 6 in a band shape to restrict the contact between cathode part 8 and anode body 6. Cathode terminal 5 is electrically connected to cathode part 8 via adhesive layer 14 made of a conductive adhesive. Principal surfaces 4S and 5S of anode terminal 4 and cathode terminal 5 are exposed from the same surface of resin sealing material 3. The exposed surface is used for solder connection with a substrate (not shown) on which electrolytic capacitor 1 is to be mounted.

The solid electrolyte layer of the electrolytic capacitor manufactured by the above manufacturing method can include a conductive polymer (first conductive polymer and second conductive polymer), a first compound, and a second compound that is different from the first compound. When the skeleton of the first compound is a skeleton of naphthalene or anthraquinone, a number of $SO_3$-containing groups bonded to the skeleton may be one or more, preferably two or more, and more preferably two. When the skeleton of the first compound is a benzene skeleton, the number of $SO_3$-containing groups bonded to the benzene skeleton is two or more, and preferably two. The first compound is, for example, an amine salt. The second compound is, for example, a first dopant contained in the first conductive polymer layer and/or a second dopant contained in the second conductive polymer layer, and may be, for example, a polyanionic acid.

A concentration of the first compound in the solid electrolyte layer may change in the thickness direction of the solid electrolyte layer. For example, in the solid electrolyte layer, the concentration of the first compound in a region close to the dielectric layer is greater than that in a region close to the cathode lead-out layer. This is because the first compound is likely to be unevenly distributed to a region close to the dielectric layer due to infiltration of the first compound into the first conductive polymer layer. As the first compound is more unevenly distributed to the region close to the dielectric layer, the interface resistance between the first conductive polymer layer and the second conductive polymer layer tends to become small.

The electrolytic capacitor of the present invention is not limited to the electrolytic capacitor having the above structure but can be applied to electrolytic capacitors having various structures. For example, the present invention can be applied to a wound electrolytic capacitor, an electrolytic capacitor using a sintered body of metal powder as an anode body, and the like.

Example 1

The electrolytic capacitor shown in FIG. 1 was produced in the following manner, and its characteristics were evaluated.
(1) Step of Preparing Anode Body An aluminum foil (thickness: 100 μm) was prepared as a base material, and the surface of the aluminum foil was subjected to etching treatment to obtain anode body 6.
(2) Step of Forming Dielectric Layer A dielectric layer including aluminum oxide ($Al_2O_3$) was formed on the surface of the anode body by immersing the anode body in a phosphoric acid solution with a concentration of 0.3% by mass (solution temperature of 70° C.) and applying a DC voltage of 70 V for 20 minutes.
(3) Step of Forming Solid Electrolyte Layer
(i) Step of Forming First Conductive Polymer Layer A first dispersion (hereinafter referred to as PEDOT/PSS), which contains fine particles (average particle size of fine particles: 200 nm) of poly(3,4-ethylenedioxythiophene) (first conductive polymer: PEDOT) doped with polystyrenesulfonic acid (first dopant: PSS), was applied onto the dielectric layer, and then dried at 100° C. for 40 minutes. By repeatedly performing the immersion in the first dispersion and drying, a first conductive polymer layer including the first conductive polymer was formed so as to cover the surface of the dielectric layer. The average thickness of the first conductive polymer layer was measured by a scanning electron microscope (SEM) to be about 1 μm. The proportion of PEDOT/PSS in the first dispersion was 4% by mass.
(ii) Step of Applying First Treatment Liquid to First Conductive Polymer Layer A first treatment liquid was prepared using an amine salt of naphthalenesulfonic acid as the first compound. As the solvent, a mixed solvent of 90% by mass of water and 10% by mass of ethanol was used. As an amine compound to form an amine salt, N,N-dimethyloctylamine was used. The concentration of the first compound in the first treatment liquid was 0.5 mol/L. The first conductive polymer layer was immersed into the first treatment liquid for 10 minutes, and then dried at 100° C. for 30 minutes.
(iii) Step of Forming Second Conductive Polymer Layer A second dispersion (average particle size of fine particles of 500 nm) containing another PEDOT/PSS was immersed into the first conductive polymer layer to which the first treatment liquid had been applied, and then dried at 100° C. for 60 minutes. The proportion of PEDOT/PSS in the second dispersion was 4% by mass.

By alternately repeating the immersion into and drying of the first treatment liquid and the immersion into and drying of the second dispersion a plurality of times, the second conductive polymer layer was formed so as to cover the surface of the first conductive polymer layer. When the average thickness of the second conductive polymer layer was measured in the same manner as in the case of the first conductive polymer layer, it was about 10 μm.
(4) Step of Forming Cathode Lead-Out Layer A dispersion liquid of graphite particles dispersed in water was applied onto the surface of the solid electrolyte layer, and then dried in the air to form a carbon layer. Next, a silver paste containing silver particles and an epoxy resin was applied onto the surface of the carbon layer, and then heated to form a silver-paste layer.
(5) Assembly of Electrolytic Capacitor An anode terminal, a cathode terminal, and an adhesive layer were disposed in a capacitor element, and the capacitor element was sealed with a resin sealing material to complete an electrolytic capacitor A1 having a rating of 20 V and 1 ρF.

Example 2

An electrolytic capacitor A2 was produced in the same manner as the capacitor A1, except that an amine salt of naphthalenedisulfonic acid was used as the first compound.

Example 3

An electrolytic capacitor A3 was produced in the same manner as the capacitor A1, except that an amine salt of anthraquinone disulfonic acid was used as the first compound.

Example 4

An electrolytic capacitor A4 was produced in the same manner as the capacitor A1, except that an amine salt of benzenedisulfonic acid was used as the first compound.

Comparative Example 1

An electrolytic capacitor B1 was produced in the same manner as the capacitor A1, except that an amine salt of benzenesulfonic acid was used instead of the first compound.

The following evaluations were performed on the electrolytic capacitors of the examples and the comparative examples produced above.

Evaluation (a) Heat Resistance Property

After the electrolytic capacitor was stored at a temperature of 145° C. for 125 hours, an ESR value (mΩ) and capacitance (μF) at a frequency of 100 kHz of the electrolytic capacitor were measured in an environment at 20° C. using an inductance-capacitance-resistance (LCR) meter for four-terminal measurement, to determine a change rate ($R_1$) of the ESR and a change rate ($C_1$ (%)) of the capacitance with respect to the initial value.

(b) Moisture Resistance Property

After a rated voltage was applied to the electrolytic capacitor for 125 hours in an environment of 85° C./85% Rh, an ESR value (mΩ) and capacitance (ρF) at a frequency of 100 kHz of the electrolytic capacitor were measured in an environment at 20° C. using the LCR meter for four-terminal measurement, to determine a change rate ($R_2$) of the ESR and a change rate ($C_2$ (%)) of the capacitance with respect to the initial value.

It can be understood that Examples 1 to 4 have excellent moisture resistance property. It can be understood that among the examples, the use of the first compound having a naphthalene skeleton and two $SO_3$-containing groups improves the moisture resistance property and the heat resistance property in a favorable balance.

The electrolytic capacitor according to the present invention can be used for various applications where excellent moisture resistance property and heat resistance property are required.

The invention claimed is:

1. An electrolytic capacitor comprising:
an anode body;
a dielectric layer disposed on a surface of the anode body; and
a solid electrolyte layer disposed on a surface of the dielectric layer,
wherein:
the solid electrolyte layer includes a conductive polymer, a first compound, and a second compound that is different from the first compound,
the first compound has a skeleton of naphthalene or anthraquinone, and includes at least one $SO_3$-containing group bonded to the skeleton,
the at least one $SO_3$-containing group is at least one selected from a group consisting of a sulfonic acid group and a sulfonate group,
the second compound includes a polyanionic acid, and
a concentration of the first compound in a first region of the solid electrolyte layer is greater than a concentration of the first compound in a region other than the first region, the first region being close to the dielectric layer in a thickness direction of the solid electrolyte layer.

2. The electrolytic capacitor according to claim 1, wherein the first compound is an amine salt.

3. An electrolytic capacitor comprising:
an anode body;
a dielectric layer disposed on a surface of the anode body; and
a solid electrolyte layer disposed on a surface of the dielectric layer,
wherein:
the solid electrolyte layer includes a conductive polymer, a first compound, and a second compound that is different from the first compound,
the first compound has a skeleton of benzene, naphthalene, or anthraquinone, and includes two or more $SO_3$-containing group bonded to the skeleton,
each of the two or more $SO_3$-containing group is at least one selected from a group consisting of a sulfonic acid group and a sulfonate group,

TABLE 1

| | First compound | | Heat resistance property | | Moisture resistance property | |
|---|---|---|---|---|---|---|
| Capacitor | Anion | Amine | $C_1$ | $R_1$ | $C_2$ | $R_2$ |
| A1 | Naphthalenesulfonic acid | N,N-dimethyloctylamine | −4% | 2.0 | 0% | 3.0 |
| A2 | Naphthalenedisulfonic acid | | −4% | 1.9 | 8% | 2.8 |
| A3 | Anthraquinone disulfonic acid | | −13% | 1.8 | 13% | 2.8 |
| A4 | Benzenedisulfonic acid | | −7% | 2.1 | 10% | 3.0 |
| B1 | Benzenesulfonic acid | | −5% | 2.5 | −19% | 5.0 | the second compound includes a polyanionic acid, and
a concentration of the first compound in a first region of the solid electrolyte layer is greater than a concentration of the first compound in a region other than the first region, the first region being close to the dielectric layer in a thickness direction of the solid electrolyte layer.

4. The electrolytic capacitor according to claim 3, wherein the first compound is an amine salt.

\* \* \* \* \*